(12) United States Patent
Kondo et al.

(10) Patent No.: US 8,504,212 B2
(45) Date of Patent: Aug. 6, 2013

(54) CONTROLLER AND CONTROL TECHNIQUES FOR WINDFARM

(75) Inventors: Shinichi Kondo, Hitachi (JP); Yasunori Ono, Mito (JP); Noriyuki Uchiyama, Hitachinaka (JP); Masaya Ichinose, Hitachiota (JP); Mitsugu Matsutake, Hitachi (JP); Takashi Aihara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 413 days.

(21) Appl. No.: 12/857,198

(22) Filed: Aug. 16, 2010

(65) Prior Publication Data

US 2011/0046803 A1 Feb. 24, 2011

(30) Foreign Application Priority Data

Aug. 18, 2009 (JP) ................... 2009-189295

(51) Int. Cl.
*G05D 11/00* (2006.01)
(52) U.S. Cl.
USPC ............... 700/287; 700/28; 700/304; 290/44
(58) Field of Classification Search
USPC ............. 700/286, 287, 301, 302, 304; 290/44
See application file for complete search history.

(56) References Cited

U.S. PATENT DOCUMENTS

2004/0183307 A1 9/2004 Yoshida et al.
2011/0204630 A1* 8/2011 Arinaga et al. ................. 290/44

FOREIGN PATENT DOCUMENTS

| JP | 10-339259 A | 12/1998 |
|----|----|----|
| JP | 2001-178194 A | 6/2001 |
| JP | 2002-27679 A | 1/2002 |
| JP | 2004-301116 A | 10/2004 |
| JP | 2006-22792 A | 1/2006 |

OTHER PUBLICATIONS

Mechanical English translation of JP 2004-301116 A, previously cited and filed as B1 in the Information Disclosure Statement filed on Aug. 16, 2010 (eighteen (18) pages).
Japanese Office Action with English translation dated Dec. 20, 2011 (six (6) pages).

* cited by examiner

*Primary Examiner* — Mohammad Ali
*Assistant Examiner* — Nathan Laughlin
(74) *Attorney, Agent, or Firm* — Crowell & Moring LLP

(57) ABSTRACT

The disclosed windfarm control system comprising a windfarm and a central controller; the windfarm including plural wind power generators whose rotational speeds are variable, plural aerographs disposed in the vicinity of the wind power generators to measure the directions and powers of the wind at the sites of the generators, and plural local controllers disposed in the vicinity of the wind power generators to control the output of the wind power generators by controlling the rotational speeds of the generators; wherein the central controller calculats the control level which maintains the output of the windfarm constant for a predetermined time period and instructs the local controllers to control the rpm's of the wind power generators in accordance with the control level.

9 Claims, 16 Drawing Sheets

FIG.8
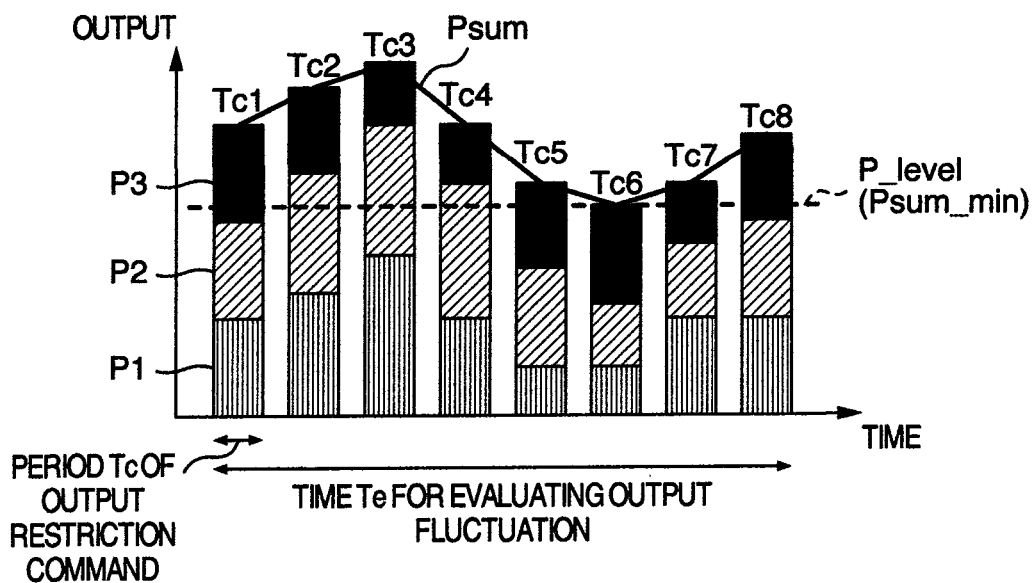
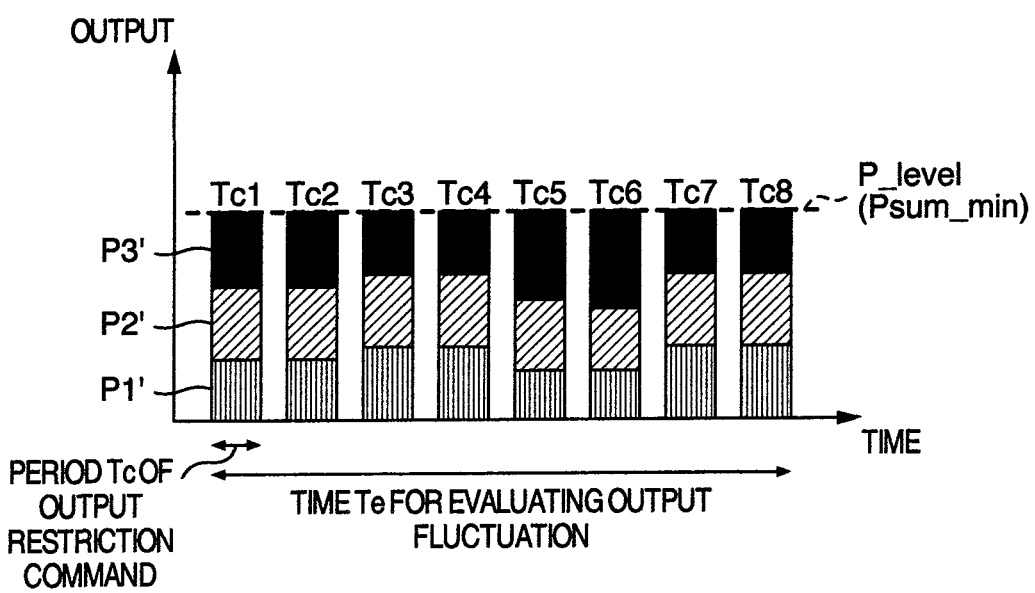

FIG. 10
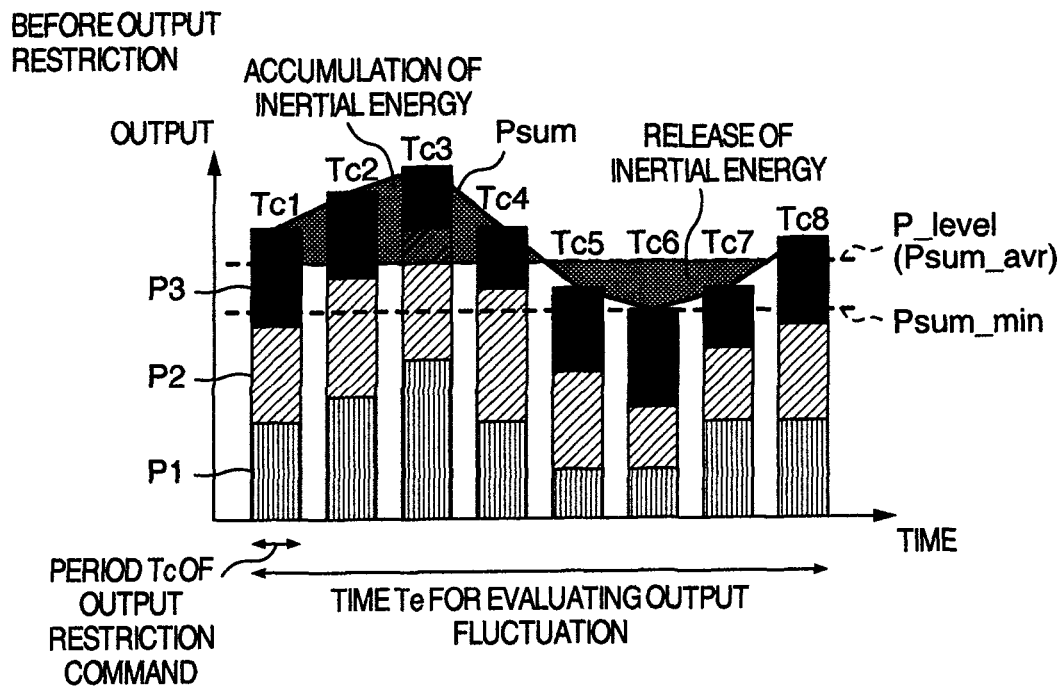
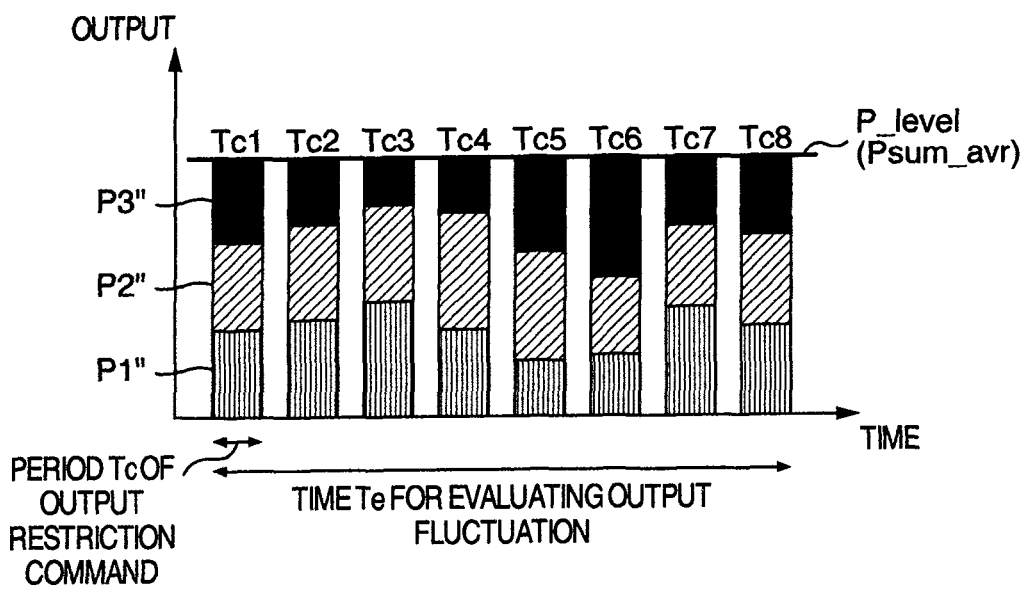

US 8,504,212 B2

CONTROLLER AND CONTROL TECHNIQUES FOR WINDFARM

BACKGROUND OF THE INVENTION

This invention relates to a system for controlling a windfarm, and an apparatus and a method for controlling a windfarm.

Recently, there has been an increasing tendency for the introduction of wind power generation as a countermeasure against global warming. From the viewpoint of cost effect, the wind power generation finds its most prevalent form of practice in the "windfarm" wherein plural wind power generators are distributed in a specific area and all the generators are administrated together by a central station.

Since electricity cannot be stored basically, the amount of its generation must balance the amount of its consumption. If the balance between these amounts collapses, the frequency of the generated power will fluctuate. In the case of the wind power generation, whose power output fluctuates depending on the weather condition, the frequency of the output power is maintained constant by causing the amount of power generated by the generators of the thermal power stations within the power system to which the windfarm is connected, to follow the rate of change in the power demand. To be concrete, in order to cope with the change in the power demand, the governor-free control of generator is used for the short-term change within several minutes; the automatic load frequency control (LFC) is employed for the intermediate change from several minutes to about nineteen minutes; and the economic load dispatching control (EDC) is adopted for the long-term change for more than about nineteen minutes.

However, as the number of power generation stations increases, the adjustment of the voltage and the frequency of the power system becomes difficult. For example, there occurs a problem that the capacity of an automatic load frequency control (LFC) procedure becomes deficient when the load becomes lighter. Therefore, in order to promote the introduction of wind power generation while maintaining the quality of electric power at a satisfactory level, it is necessary to enhance the control capability on the side of the power system or to suppress the fluctuation of power generated by wind power generators.

For example, JP-A-2004-301116 discloses a method of controlling with high efficiency the operation of a wind power generation systems on the basis of the direction and velocity of wind blowing toward each windmill.

However, JP-A-2004-301116, which employs the procedure for suppressing the power fluctuation by using such an electric power storage device as accumulator batteries, will cause the entrepreneurs of wind power generation to suffer the burden of cost.

SUMMARY OF THE INVENTION

The object of this invention, which has been made to solve the problem as described above, is to provide a technique for suppressing the fluctuation of the electric power generated by a windfarm and maintaining the output level constant.

In order to solve the above problem, this invention provides a technique for suppressing the fluctuation of the electric power generated by a windfarm and for maintaining the output level constant.

For example, a windfarm control system according to this invention includes:

a windfarm comprising:
plural wind power generators whose rotational speeds are variable;
plural aerographs disposed in the vicinity of the wind power generators, to measure the directions and powers of the wind at the sites of the generators; and
plural local controllers disposed in the vicinity of the wind power generators, to control the output of the wind power generators by controlling the rotational speeds of the generators; and
a windfarm controller for executing the processes of:
locating the most windward one of the wind power generators on the basis of the directions and powers of the wind detected by the aerographs;
estimating the fluctuations of the wind velocities at the sites of the respective wind power generators during a predetermined time period on the basis of the direction and power of the wind at the site of the most windward generator and the distances and directions of the other wind power generators measured from the most windward generator;
estimating the fluctuation of the output of the windfarm as a whole during the predetermined time period on the basis of the fluctuations of the wind velocities at the site of the respective wind power generators;
calculating the control level that is the value of the output whose maintained value is guaranteed during the predetermined time period;
obtaining the values of the outputs of the respective wind power generators;
calculating those outputs of the respective wind power generators which make the output of the windfarm as a whole equal to the control level, and the rpm's of the respective wind power generators which produce those outputs of the respective wind power generators; and
delivering the thus calculated outputs and rpm's of the respective wind power generators to the respective local controllers associated respectively with the respective wind power generators.

According to this invention, a technique can be provided which can suppress the fluctuation of electric power supplied from a windfarm and keep the electric power output of the windfarm constant.

Other objects, features and advantages of the invention will become apparent from the following description of the embodiments of the invention taken in conjunction with the accompanying drawings.

BRIEF DESCRIPTION OF THE DRAWINGS

FIG. 8 graphically shows the outputs P1~P3 of the respective wind power generators free of output restriction control and the outputs P1'~P3' of the respective wind power generators under output restriction control;

FIG. 10 graphically shows the outputs P1~P3 of the respective wind power generators without the output limiting control and the outputs P1'~P3' of the same generators under the output limiting control;

DETAILED DESCRIPTION OF THE INVENTION

[First Mode of Practice]

The first mode of practice of this invention will be described below with reference to the attached drawings.

Figure 1:
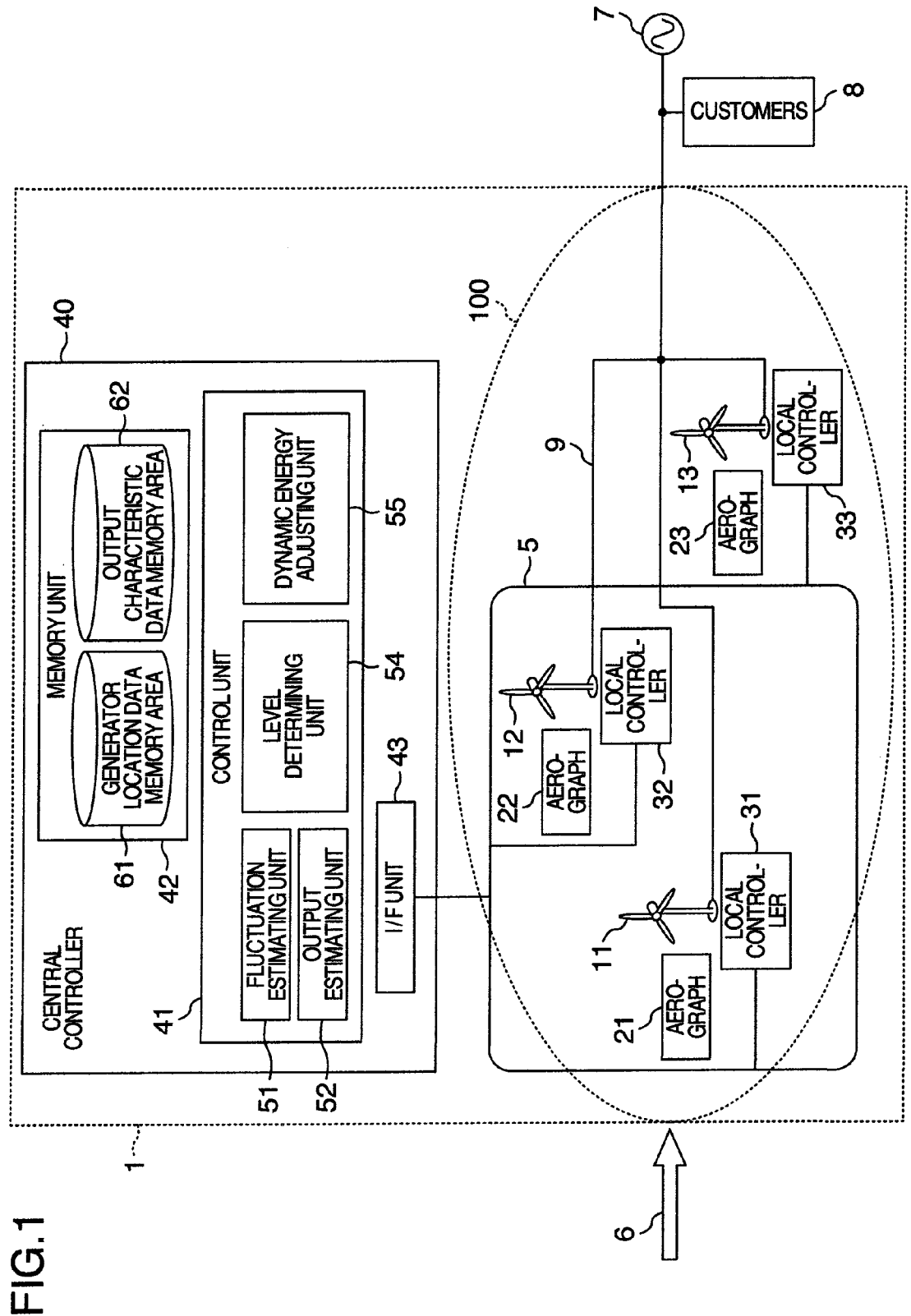
FIG. 1 shows in block diagram the structure of a windfarm control system 1 according to this invention.

FIG. 1 shows in block diagram the structure of a windfarm control system according to this invention.

A windfarm control system 1 consists mainly of a windfarm 100 including plural wind power generators and a central controller 40 for administrating the windfarm in a concentrated manner.

As shown in FIG. 1, the windfarm 100 comprises wind power generators 11, 12, 13; aerographs 21, 22, 23 disposed close to and electrically connected with the wind generators 11, 12, 13 and designed to measure at least the wind velocity and the atmospheric pressure; local controllers 31, 32, 33; and a communication network 5 for connecting the local controllers 31, 32, 33 with the central controller 40.

Regarding each of the wind power generators 11, 12, 13, both the rotational speed and the blade pitch of the windmill are variable and controllable. The wind power generators 11, 12, 13 are coupled to a power system 7 via transmission lines 9 and also supply electric power for customers 8.

The aerographs 21, 22, 23 are located in the vicinity of the respective wind power generators 11, 12, 13 and measure the direction and velocity of the wind and the atmospheric pressure at the sites.

Local controllers 31, 32, 33 send out such weather data as including the direction and the velocity of the wind measured by the corresponding aerographs 21, 22, 23, to a central controller 40 via a network 5. The local controllers 31, 32, 33 control the rotational speeds of the corresponding wind power generators 11, 12, 13 in accordance with the rotational-speed control command outputted from the central controller 40, detect the output values of power delivered by the corresponding wind power generators 11, 12, 13, and send out the same values to the central controller 40, if necessary.

The central controller 40 comprises a control unit 41, a memory unit 42 and an input/output interface unit 43 (hereafter referred to as I/F unit).

The control unit 41 comprises a fluctuation estimating unit 51 for estimating the fluctuations of the wind velocities at the respective wind power generators during a determined time period on the basis of the weather data obtained by the local controllers 31, 32, 33; an output estimating unit 52 for estimating the output fluctuation of the windfarm 100 as a whole on the basis of the estimated fluctuations of the wind velocities; a level determining unit 54 for determining a control level and a dynamic energy adjusting unit 55.

The memory unit 42 includes a generator location data memory area 61 that previously stores information regarding the distances L's and the directions θ's from each wind power generator to the other wind power generators, and an output characteristic data memory area 62 that previously stores output characteristic data regarding the output characteristics of the respective wind power generators of the windfarm 100.

The I/F unit 43 connects the central controller 40 with other devices and the network 5 to enable data communication therebetween.

The process performed by the central controller 40 will be described below in detail.

When the fluctuation estimating unit 51 receives via the I/F unit 43 the weather data sent out from the respective local controllers at a predetermined interval of time, it locates the most windward generator of all the generators of the windfarm 100. This way of location is possible through judgment that the most windward generator is the generator with which the aerograph is associated that has observed the weather data including the newest fluctuation in wind power.

To be concrete, for example, if the wind is blowing in the direction indicated by a broad arrow 6 as shown in FIG. 1, the new fluctuation of the wind velocity is initially sensed by the wind power generator 11 of all the generators of the windfarm 100. Therefore, the fluctuation estimating unit 51 passes a judgment that the wind power generator 11 is located most windward.

Then, the fluctuation estimating unit 51 estimates the fluctuations of the wind velocities at the wind power generators 12, 13 during the predetermined time of estimation on the basis of the wind velocity data included in the weather data observed by the aerograph 21 disposed in the vicinity of the wind power generator 11 located most windward. The fluctuation estimating unit 51 calculates the durations of time after which the initially observed fluctuation of the wind power reaches the other wind power generators 12, 13.

Figure 2:
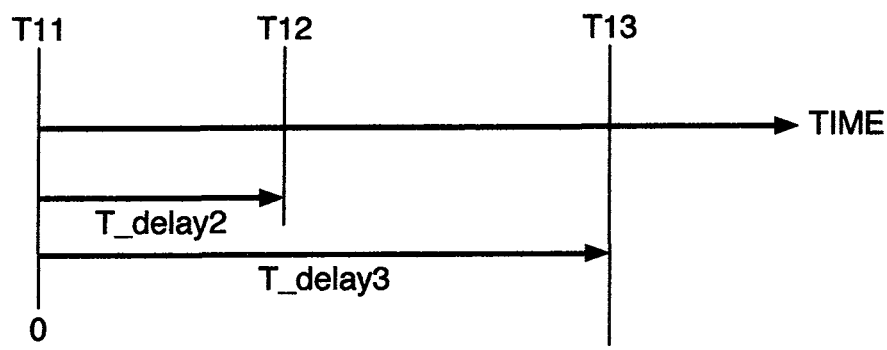
FIG. 2 diagrammatically shows the idea of delays after which the initial fluctuation of the wind velocity observed by the wind power generator located most windward reaches the other wind power generators.
Figure 3:
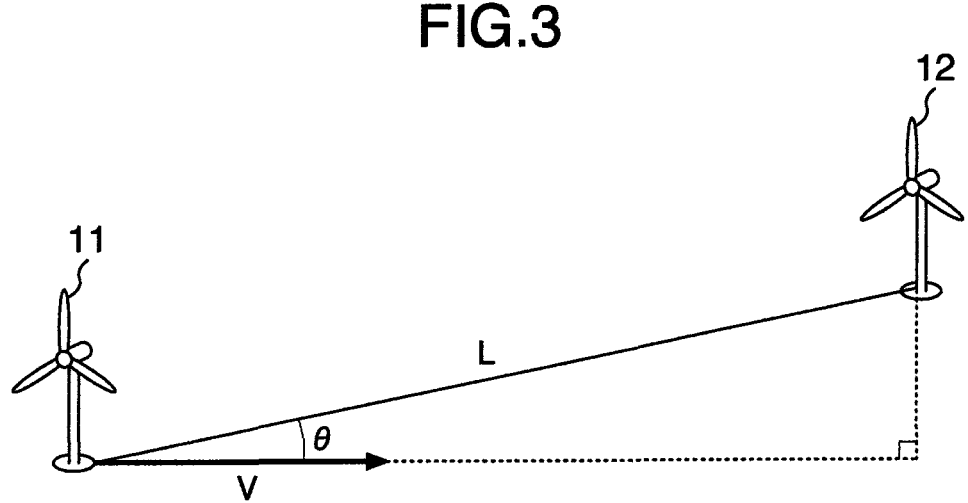
FIG. 3 shows the relationship among the locations of wind power generators, wind direction and wind velocity.

FIG. 2 diagrammatically shows the idea of delays after which the initial fluctuation of the wind velocity observed at the wind power generator 11 located most windward reaches the other wind power generators 12, 13. FIG. 3 shows the relationship among the locations of wind power generators, wind direction and wind velocity.

In FIG. 2, let it be assumed that the moment the new fluctuation of the wind velocity is detected at the location of the wind power generator 11 is denoted by T11, and the moments at which the very fluctuation of the wind velocity reaches the wind power generators 12 and 13 are represented by T12 and T13, respectively. Then, the fluctuation estimating unit 51 calculates the delays in arrival time, T_delay 2 and T_delay 3: the delay T_delay 2 being the time required for the new fluctuation of the wind velocity to travel from the generator 11 to the generator 12, and the delay T_delay 3 being the time required for the new fluctuation to travel from the generator 11 to the generator 13.

To be concrete, the fluctuation estimating unit 51 reads out of the generator location data memory area 61 the distance L and the directional angle θ (see FIG. 3) measured from the wind power generator 11 to the wind power generator 12 (of 13). Further, the fluctuation estimating unit 51 calculates the delays in arrival time, T_delay 2 and T_delay 3, by using the following expression (1) on the basis of the wind velocity data V included in the weather data obtained at T11 from the local controller 31.

[Expression 1]

$$T\_delay = (L\cos\theta)/V \quad (1)$$

Figure 4:
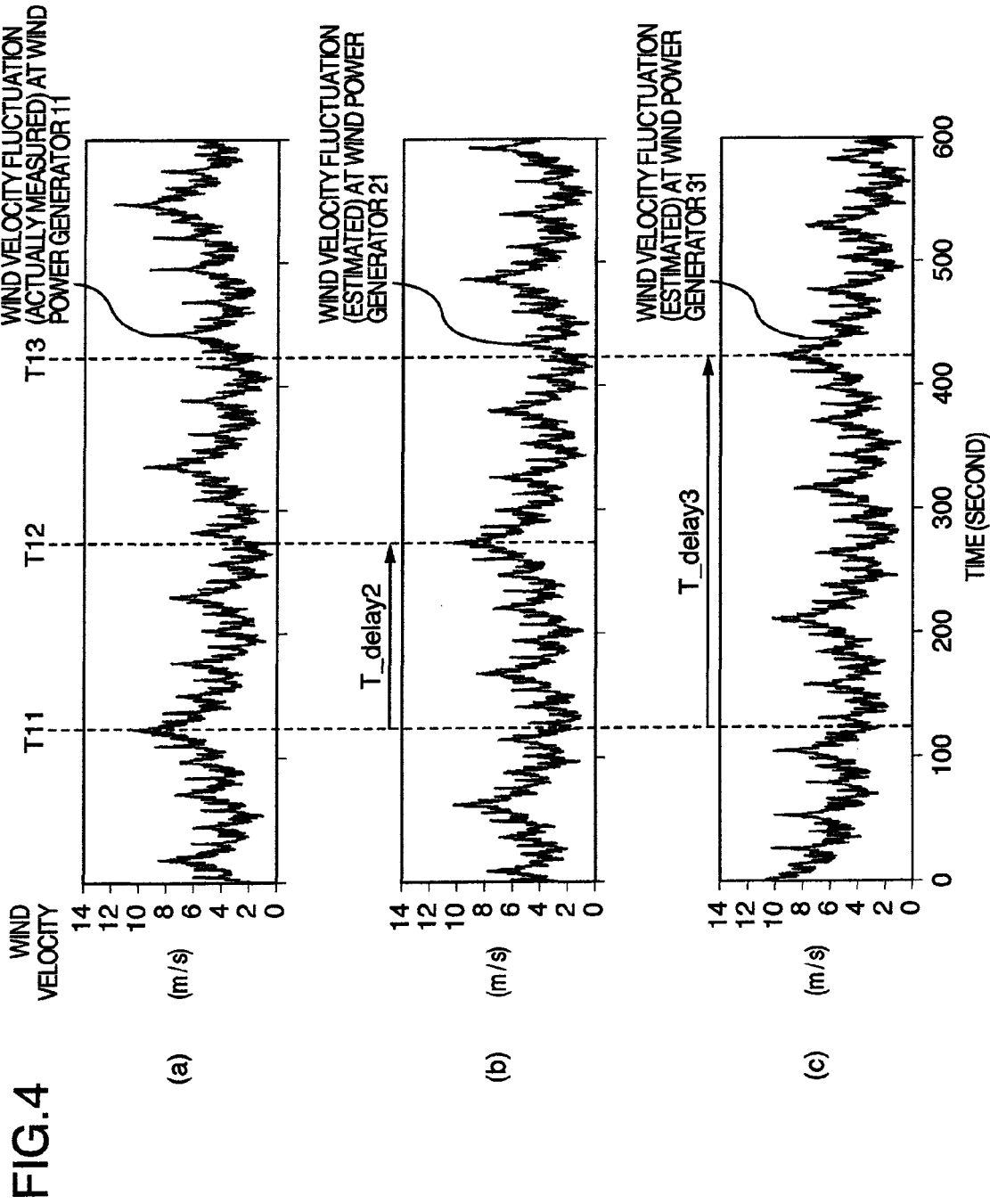
FIG. 4(a) graphically shows the wind velocity fluctuation actually measured at the site of the wind power generator 11.
FIG. 4(b) graphically shows the estimated wind velocity fluctuation at the site of the wind power generator 12.
FIG. 4(c) graphically shows the estimated wind velocity fluctuation at the site of the wind power generator 13.

FIGS. 4(a) through 4(c) graphically show the measured and estimated data of the wind velocity fluctuations with respect to the wind power generators 11, 12, 13, respectively, estimated for a predetermined wind velocity fluctuation evaluating time (600 seconds) according to the procedure described above. FIG. 4(a) graphically shows the wind velocity fluctuation actually measured at the site of the wind power generator 11, FIG. 4(b) the estimated wind velocity fluctuation at the site of the wind power generator 12, and FIG. 4(c) the estimated wind velocity fluctuation at the site of the wind power generator 13.

As shown in FIGS. 4(a) through 4(c), the wind velocity fluctuation can be estimated by assuming that the wind velocity fluctuation detected at the site of the wind power generator 11 reaches the wind power generator 12 in a lapse of time T_delay 2 and the wind power generator 13 in a lapse of time T_delay 3.

After having calculated such estimated data of wind velocity fluctuations as described above, the fluctuation estimating unit 51 delivers an output estimation demand to the output estimating unit 52.

Upon having received the output estimation demand, the output estimating unit 52 estimates the output fluctuations of the respective wind power generators and the windfarm as a whole, during the predetermined time Te of evaluating the output fluctuation, on the basis of the calculated data of estimated wind velocity and the output characteristic data stored previously in the memory area 62.

Figure 5:
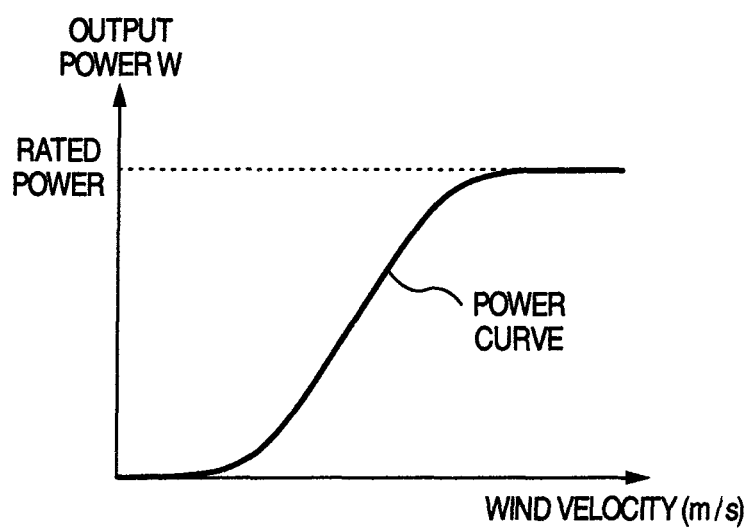
FIG. 5 graphically shows the characteristic curve illustrating the relationship between the wind velocity contained in the output characteristic data and the output of a wind power generator.

FIG. 5 graphically shows the characteristic curve illustrating the relationship between the wind velocity contained in the output characteristic data and the output of a wind power generator. The output estimating unit 52 calculates the values of the outputs of the respective wind power generators from the estimated data of wind velocity fluctuation in accordance with this curve of output power versus wind velocity. It is to be noted that such characteristic curves depend on the specifications of the respective wind power generators. Accordingly, each generator must be provided with a proper curve of output power versus wind velocity.

Figure 6A:
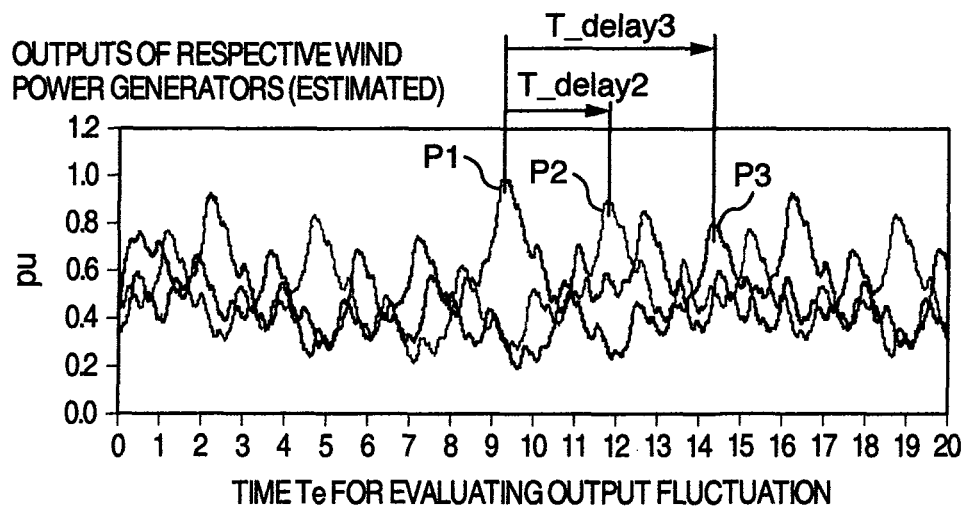
FIG. 6A graphically shows the estimated data of output fluctuation with respect to the respective wind power generators.

FIGS. 6A and 6C graphically show the estimated data of the output fluctuation with respect to the windfarm 100 during the predetermined time Te (20 minutes) of evaluating the output fluctuation in accordance with the procedure described above.

In FIG. 6A showing the estimated data of output fluctuation with respect to the respective wind power generators, P1 denotes the estimated output of the wind power generator 11, P2 the estimated output of the wind power generator 12, and P3 the estimated output of the wind power generator 13.

Figure 6B:
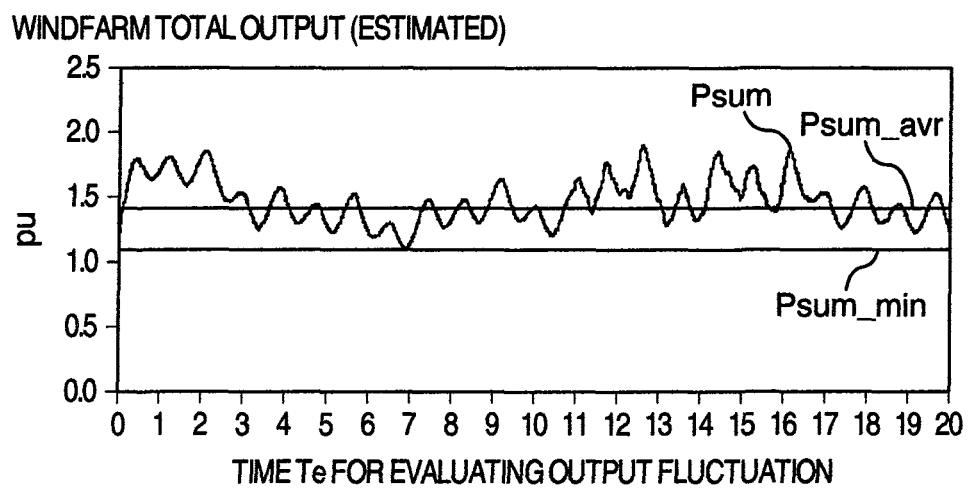
FIG. 6B graphically showing the estimated data of output fluctuation of the windfarm as a whole.

In FIG. 6B showing the estimated data of output fluctuation of the windfarm 100 as a whole, $P_{sum}$ denotes the sum of the estimated outputs P1, P2 and P3, that is, the estimated total output of the windfarm 100; $P_{sum\_min}$ the minimum value of $P_{sum}$ during the output fluctuation evaluating time Te; and $P_{sum\_avr}$ the average value of $P_{sum}$ over the output fluctuation evaluating time Te.

Upon having calculated such estimated data of output fluctuations as mentioned above, the output estimating unit 52 delivers a level determining demand to the level determining unit 54.

Upon having received the level determining demand, the level determining unit 54 establishes the control level that is the output guaranteed to be maintained constant during the output fluctuation evaluating time Te. In this case, the minimum value $P_{sum\_min}$ during the output fluctuation evaluating time Te is established as the control level $P_{\_level}$.

Upon having established the control level $P_{13}$level, the level determining unit 54 delivers an energy adjusting demand to the dynamic energy adjusting unit 55.

Upon having received the energy adjusting demand, the dynamic energy adjusting unit 55 delivers a rotational speed (or rpm) control instruction to the local controllers associated with the respective wind power generators so as to adjust the outputs of the respective wind power generators.

Figure 7:
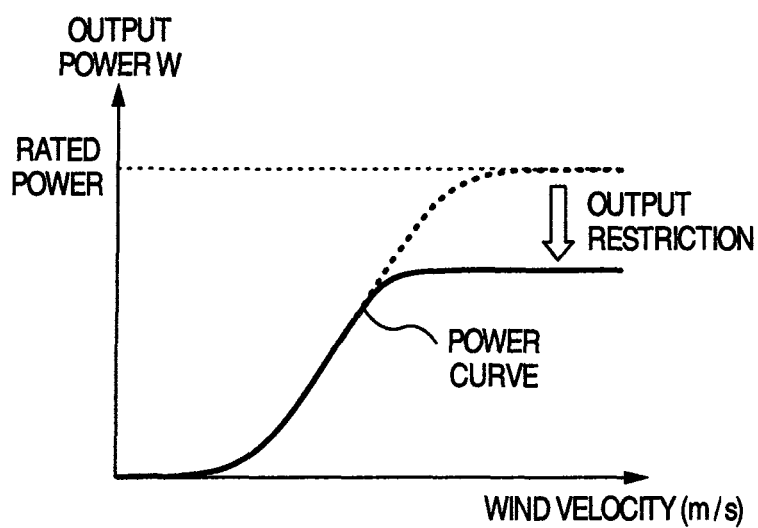
FIG. 7 graphically shows the curve of power versus wind velocity, constructed under the condition that the output of the wind power generator is restricted.

FIG. 7 graphically shows the curve of power versus wind velocity, constructed under the condition that the output of the wind power generator is restricted. The dynamic energy adjusting unit 55 calculates the values of the outputs of the respective wind power generators and the rotational speeds at which those values of the outputs can be obtained, in such a manner that the total output is limited to the value $P_{\_level}$ which is lower than the rated output ($P_{sum\_min}$ in this case). The relationship between rotational speed and output will be described later.

FIG. 8 graphically shows the outputs P1~P3 of the respective wind power generators free of output restriction by the dynamic energy adjusting unit 55 and the outputs P1'~P3' of the respective wind power generators under output restriction by the dynamic energy adjusting unit 55.

The dynamic energy adjusting unit 55 receives the values P1, P2, P3 of the outputs of the respective wind power generators 11, 12, 13 from the associated local controllers 31, 32, 33. Further, it adjusts the proportion of the outputs of the respective wind power generators and smoothes down the generated outputs so that the sum of P1, P2 and P3, i.e. $P_{sum}$, can be equal to $P_{\_level}$.

For example, if the proportion of the outputs of the respective wind power generators gives such a condition that $P_{sum} > P_{\_level}$ and P1+P2 < $P_{\_level}$ (e.g. for period Tc1, 5, 7, 8), then the dynamic energy adjusting unit 55 calculates the values of the outputs of the respective wind power generators and the rotational speeds at which those values of the outputs can be obtained, in order to satisfy the condition that $P_{sum} > P_{\_level}$ and P1=P2=P3.

In the case that P1'>P1, P2'>P2 and P3'>P3, any wind power generator having extra capacity of generating power may compensate for power deficiency.

Also in the case where P1+P2 > $P_{\_level}$ (e.g. period Tc2~4), the dynamic energy adjusting unit 55 calculates the values of the outputs of the respective wind power generators and the rotational speeds at which those values of the outputs can be obtained, in order to satisfy the condition that $P_{sum} > P_{\_level}$ and P1=P2=P3.

Further, if the proportion of the outputs of the respective wind power generators gives such a condition that $P_{sum}=P_{\_level}$ (e.g. period Tc3), the dynamic energy adjusting unit 55 performs no processing to maintain the current output.

It is to be noted here that even if P3=0 in, for example, period Tc2, the condition that $P_{sum}=P_{\_level}$ can be satisfied. However, from the viewpoing of making the deteriorations of the respective wind power generators uniform and therefore minimizing the related maintanance cost, all the generators should be operated uniformly rather than stopping the operation of a particular generator (generator 13 in this case). For this reason, the condition that P1=P2=P3 is preferably adopted.

Regarding the proportion of the outputs of the respective wind power generators, it suffices that the condition that $P_{sum}=P_{\_level}$ is satisfied, and it is not necessarily required that P1=P2=P3.

It suffices that the output of each wind power generator is not too much different from those of the other wind power generators, that is, the difference between the outputs of any two generators falls within a predetermined range (see FIG. 8).

Description will now be made of the relationship between the rpm and the output, of the wind power generator with reference to FIG. 9.

Figure 9:
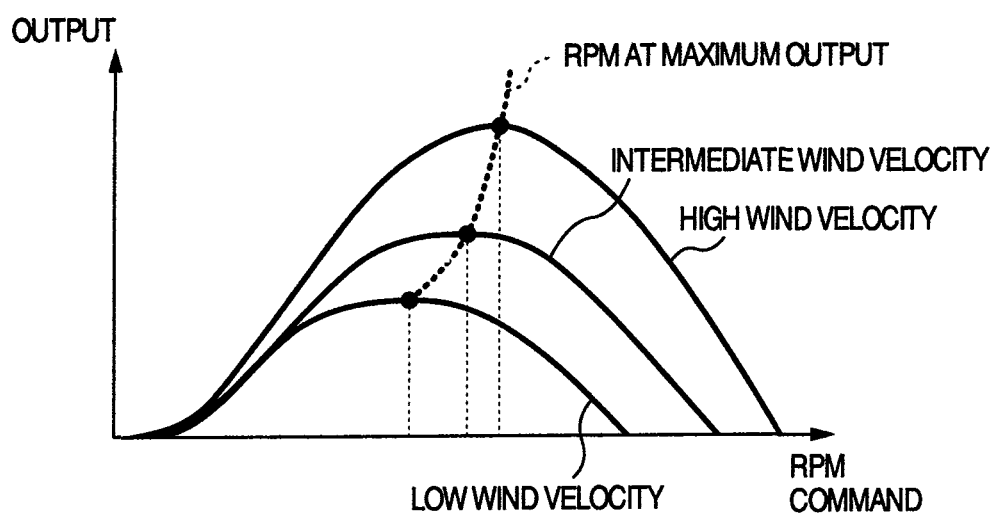
FIG. 9 graphically shows the relationship between the rpm and output of the wind power generator.

FIG. 9 graphically shows the relationship between the rotational speed, i.e. rpm, and the output, of the wind power generator.

As seen in FIG. 9, regarding the wind power generator, the rpm that produces its maximum power output is predetermined as indicated with a dotted curve. It is to be noted here that this output-rpm relationship is previously saved in the output characteristic data memory area 62.

The dynamic energy adjusting unit 55 can calculate those values of rpm's of the respective wind power generators which give the condition that $P_{sum}=P_{\_level}$ and P1=P2=P3, on the basis of the output-rpm characteristic curves.

Then, the dynamic energy adjusting unit 55 sends out the above calculated output values and rpm's as the rpm control commands, to the respective local controllers. The respective local controllers increase or decrease the rpm's of the associated generators up or down to the received rpm values so as to control the outputs of the associated generators. Alternatively, if the received rpm's can not cause the respective generators to produce expected outputs, the local controllers may adjust the rpm's of the associated generators until the expected outputs can be obtained.

With this processing described above, the output of the windfarm as a whole can be kept always constant by controlling the sum of the outputs of all the wind power generators in such a manner that it become equal to $P_{sum\_min}$ that is considered to be the value minimally corrected with respect to the estimated fluctuation of output.

With this process, however, the fluctuation of output can indeed be suppressed by smoothing the output to the minimal value, but every individual output is prevented from exceeding $P_{sum\_min}$ so that energy loss becomes considerable. Therefore, in order to avoid such large energy loss, the central controller 40 performs the process described below.

Upon having received the level determining demand, the level determining unit 54 sets up the average $P_{sum\_avr}$ of the estimated value Psum over the output fluctuation evaluating time Te, as the control level $P_{\_level}$. Then, the level determining unit 54 sends out an energy adjusting demand to the dynamic energy adjusting unit 55.

Upon having received the energy adjusting demand, the dynamic energy adjusting unit 55 calculates the rpm's of the respective wind power generators and the values of the outputs of the generators that can produce the rpm's so that the sum of the outputs can be limited to $P_{\_level}$.

FIG. 10 graphically shows the outputs P1~P3 of the respective wind power generators without the output limiting control by the dynamic energy adjusting unit 55, and the outputs P1'~P3' of the same generators under the output limiting control by the dynamic energy adjusting unit 55.

For example, during the periods Tc1~Tc4, and Tc8 where $P_{sum}>P_{\_level}$ ($P_{sum\_avr}$), the dynamic energy adjusting unit 55 calculates those outputs of the respective wind power generators which lead to the condition that $P_{sum}=P_{\_level}$ and P1=P2=P3, and the rpm's which are higher than the rpm's that give those outputs, and sends the calculated rpm's as the rpm control instructions out to the respective local controllers. Then, since the respective local controllers limit the outputs of the associated generators at specific rpm's higher than the rpm's that cause the respective wind power generators to produce the maximum outputs, the energy of wind power is stored in the form of mechanical energy (rotational energy) that results from the increase in rotational speed, i.e. rpm.

On the other hand, for example, during the periods Tc5~Tc7 where $P_{sum}<P_{\_level}$, the dynamic energy adjusting unit 55 delivers to the respective local controllers those outputs of the respective wind power generators which lead to the condition that $P_{sum}=P_{\_level}$ and P1=P2=P3, and the rpm control instructions that instruct the respective local controllers to gradually decrease the rpm's of the respective wind power generators until those outputs are obtained.

Upon having received such rpm control instructions, the respective local controllers decrease the rpm's of the associated wind power generators stepwise as previously determined, by releasing the accumulated rotational energy until the above-mentioned outputs are obtained. The local controller may be so designed as to adjust the actual rpm to the value which gives rise to the maximum output if the decrease in rpm causes a decrease in the output.

If $P_{sum}=P_{\_level}$, the dynamic energy adjusting unit 55 maintains the outputs of the generators invariable.

In this case, too, regarding the proportion of the outputs of the respective wind power generators, it is not necessarily required that P1=P2=P3. It suffices that the output of each wind power generator is not too much different from those of the other wind power generators, that is, the difference between the outputs of any two generators falls within a predetermined range (see FIG. 10).

As described above, even if $P_{\_level}$ is replaced by $P_{sum\_avr}$ that is the average of $P_{sum}$, the windfarm can continue to deliver a constant output by storing and releasing the wind power energy in the form of rotational energy.

Figure 18:
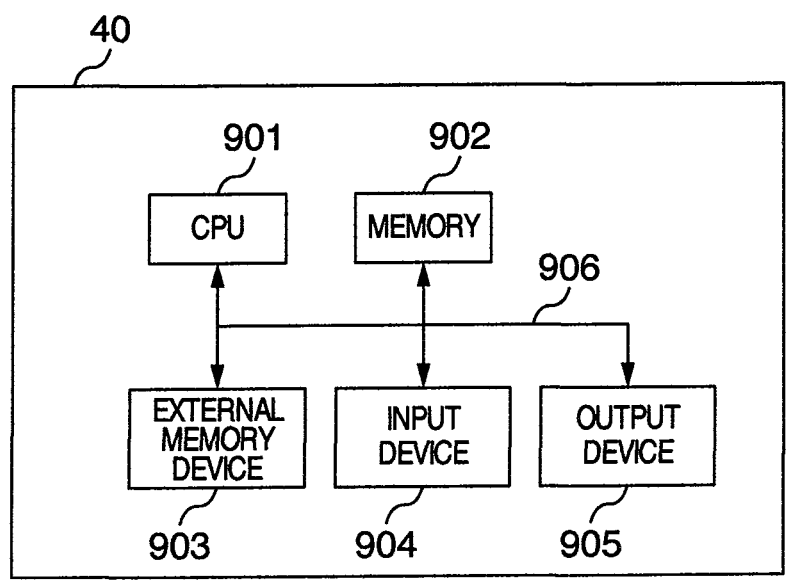
FIG. 18 shows the block diagram of the central controller 40 with its components interconnected electrically with one another.

Now, description will be made below with respect to the hardware structure of the central controller 40 as described above. FIG. 18 shows the block diagram of the central controller 40 with its components interconnected electrically with one another.

As shown in FIG. 18, the central controller 40 comprises a CPU (central processing unit) 901 for controlling the other components in a concentrated manner, a memory 902 for storing various types of data in a rewritable fashion, an external memory device 903 for storing various programs and the data generated by the programs, an input device 904, an output device 905, and bus 906 for connecting these components with one another.

In order to execute a predetermined program stored in the external memory device 903, for example, the central controller 40 writes the predetermined program into the memory 902 and then lets the CPU 901 execute it.

The above mentioned components of the central controller 40 are so selected and named as to clarify their functions for the better understanding of the processes performed by the central controller 40. Therefore, this invention is by no means limited by the way of selecting and naming the process steps. The central controller 40 may be composed of more components than are shown in FIG. 18 depending on the processes which it is to perform. Further, each component may be so designed as to perform more processes than the corresponding component in FIG. 18.

Moreover, each function of the central controller as a whole may be performed by hardware (e.g. ASIC), or the function of each component may be performed by a piece of hardware or more.

Figure 11:
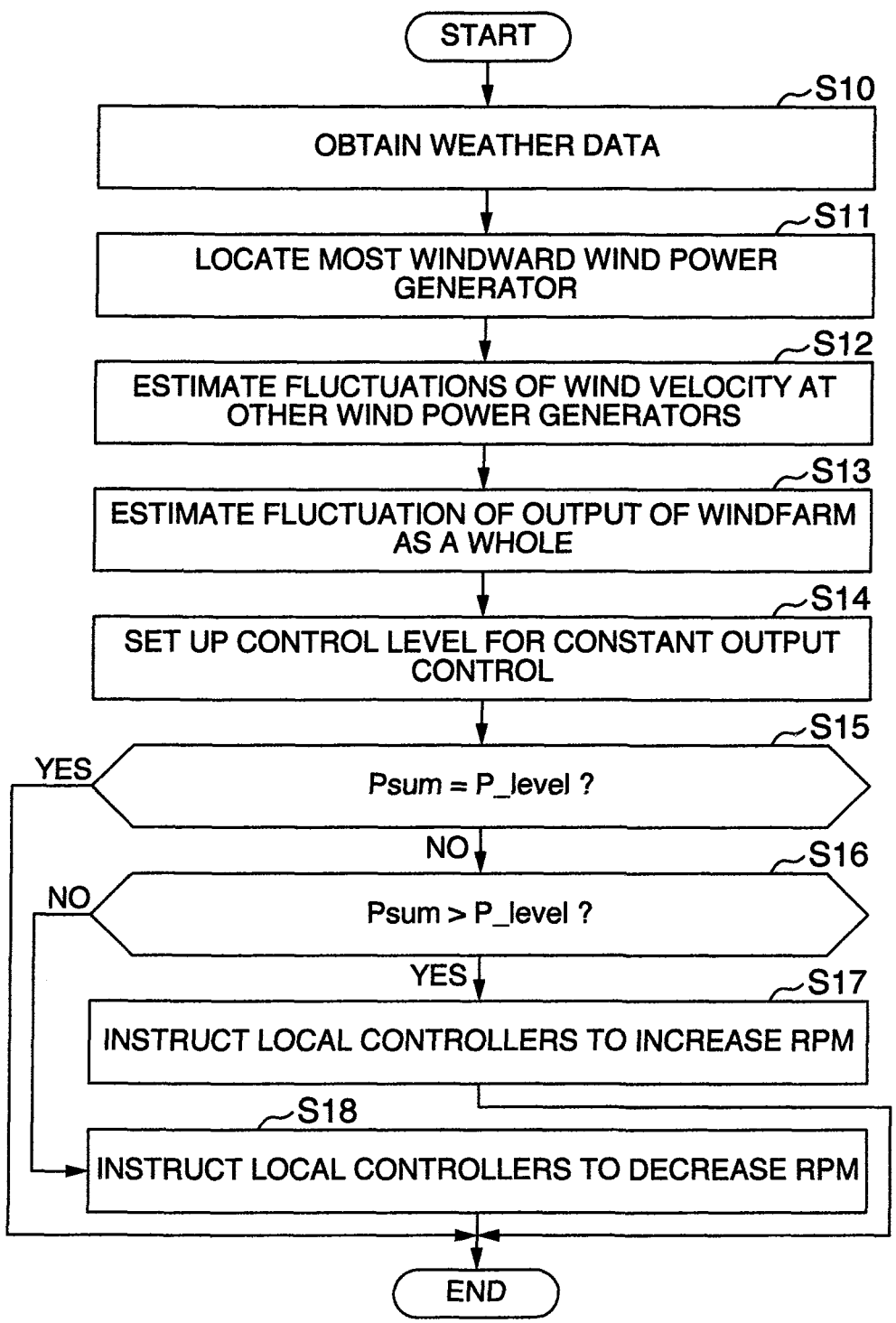
FIG. 11 is the flow chart of the process performed by the central controller 40 according to the present mode of practice of this invention.

The process performed by the central controller 40 according to the present mode of practice of this invention will now be described by the help of the flow chart shown in FIG. 11. FIG. 11 is the flow chart of the process performed by the central controller 40 according to the present mode of practice of this invention.

Upon having received the weather data from the respective local controllers at predetermined time intervals (step S10), the fluctuation estimating unit 51 selects the wind power generator situated at the most windward location (step S11).

Then, the fluctuation estimating unit 51 estimates the fluctuations of the wind velocities at the respective wind power generators (step S12) on the basis of the wind velocity data contained in the weather data associated with the most windward generator.

To be concrete, the fluctuation estimating unit 51 calculates the delays in arrival time on the basis of the distances L's and the directional angles θ's measured from the most windward generator to the other generators, and the wind velocity data V included in the weather data obtained from the most windward generator. Further, the fluctuation estimating unit 51 estimates the fluctuations of wind velocity at the sites of the other wind power generators and delivers an output estimating demand to the output estimating unit 52.

Upon having received the output estimating demand, the output estimating unit 52 estimates the fluctuation of the total output $P_{sum}$ of the windfarm 100 as whole during the predetermined output fluctuation evaluating time Te (step S13) on the basis of the calculated data representing the estimated fluctuation of wind velocity and the output characteristic data previously stored in the memory area 62. Thereafter, the output estimating unit 52 delivers a level determining demand to the level determining unit 54.

Upon having received the level determining demand, the level determining unit 54 sets up the average value $P_{sum\_avr}$ of the total outputs $P_{sum}$ calculated in step S13 during the output fluctuation evaluating time Te, as the control level $P_{\_level}$ at which a stable constant-value control is feasible (step S14). Thereafter, the level determining unit 54 delivers an energy adjusting demand to the dynamic energy adjusting unit 55.

Upon having received the energy adjusting demand, the dynamic energy adjusting unit 55 first obtains the values of the outputs of the respective wind power generators and checks whether or not the sum $P_{sum}$ of the outputs of the respective wind power generators is equal to $P_{\_level}$ (step S15).

If the value of $P_{sum}$ is equal to $P_{\_level}$ (YES in S15), the dynamic energy adjusting units 55 terminates its processing. If the value of $P_{sum}$ is not equal to $P_{\_level}$ (NO in S15), the dynamic energy adjusting units 55 checks whether or not the value of $P_{sum}$ is greater than $P_{\_level}$ (step S16).

If the value of $P_{sum}$ is greater than $P_{\_level}$ (YES in S16), then the dynamic energy adjusting unit 55 delivers rpm control instructions to the respective local controllers so that they may control the outputs of the respective generators by increasing the current rpm's above the rpm that produces the maximum output of each generator, resulting in the condition that $P_{sum}=P_{\_level}$ and P1=P2=P3 (step S17), and terminates its processing.

If the value of $P_{sum}$ is not greater than $P_{\_level}$ (NO in S16), then the dynamic energy adjusting unit 55 delivers rpm control instructions to the respective local controllers so that they may decrease the rpm's of the respective generators to the extent that the condition that $P_{sum}=P_{\_level}$ and P1=P2=P3 is reached (step S18), and terminates its processing.

Here, the description of the first mode of practice of this invention has finished.

As described above, with the windfarm control system 1 according to the first mode of practice of this invention, it is possible to smooth the output of the windfarm as a whole by limiting the outputs of the respective wind power generators in such a manner that the sum $P_{sum}$ of the outputs of the generators becomes equal to the value $P_{\_level}$ estimated from the fluctuations of wind velocity.

Further, the windfarm control system 1 can maintain the higher output at a constant level by increasing the rpm's of the generators to store wind power as rotational energy if the total output is superfluous, and by decreasing the rpm's of the generators to release the rotational energy if the total output is deficient.

[Second Mode of Practice]

Now, the second mode of practice of this invention will be described. The windfarm control system 2 according to the second mode of practice differs from the windfarm control system 1 according to the first mode of practice in that the correction in estimating the output of the windfarm is made by using barometric data. In the following are mainly described those parts of the system 2 which differ from the corresponding parts of the system 1.

Figure 12:
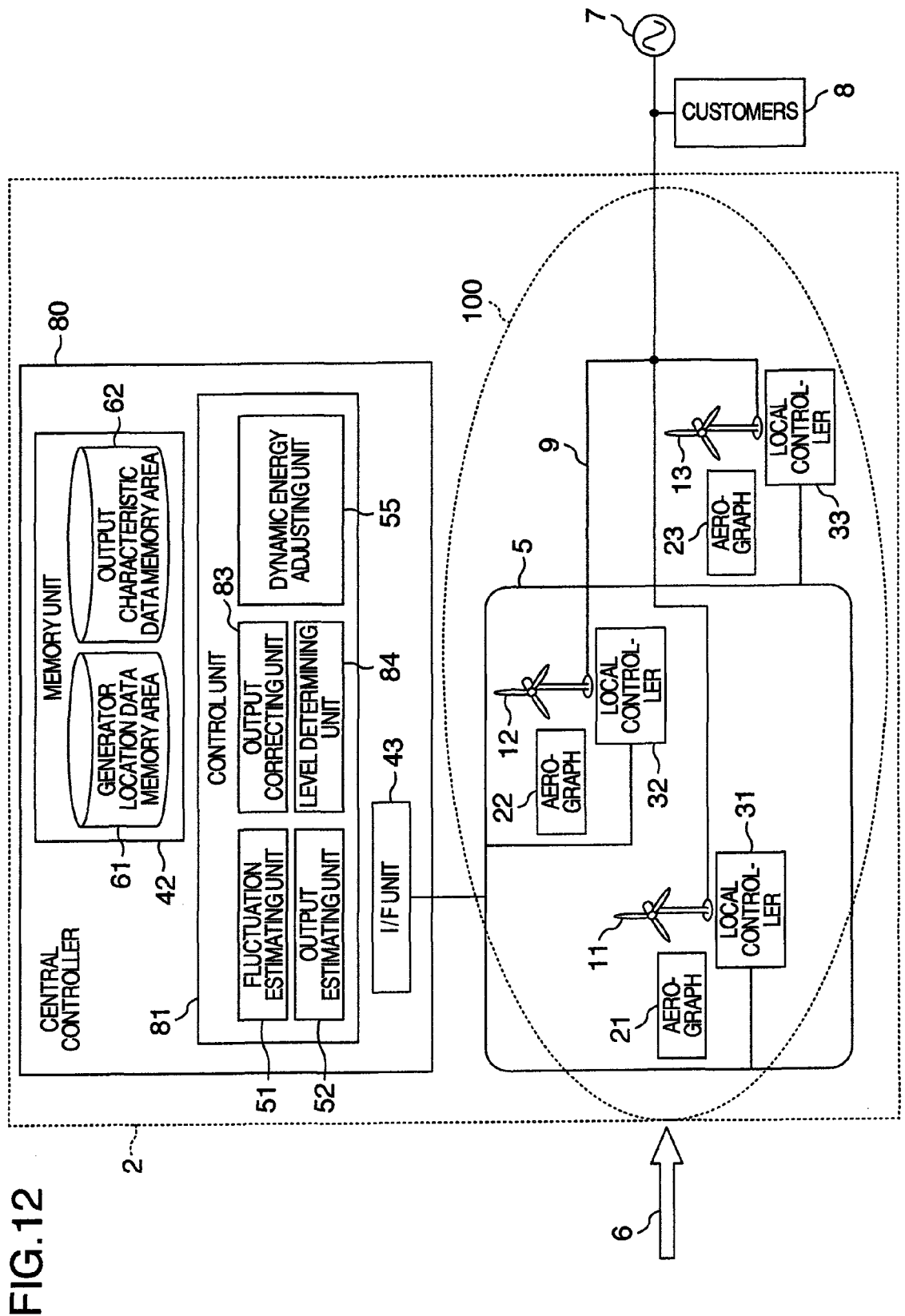
FIG. 12 schematically shows the structure of a windfarm control system 2 according to a second mode of practice of this invention.

FIG. 12 schematically shows the structure of the windfarm control system 2 in the second mode of practice of this invention.

The windfarm control system 2 consists mainly of a windfarm 100 and a central controller 80.

The central controller 80 incorporates therein a control unit 81, which incorporates therein the output estimating unit 52 and an output correcting unit 83. The output correcting unit 83 corrects the output estimating data calculated by the output estimating unit 52.

The relationship between atmospheric pressure and wind velocity will first be explained.

Figure 13:
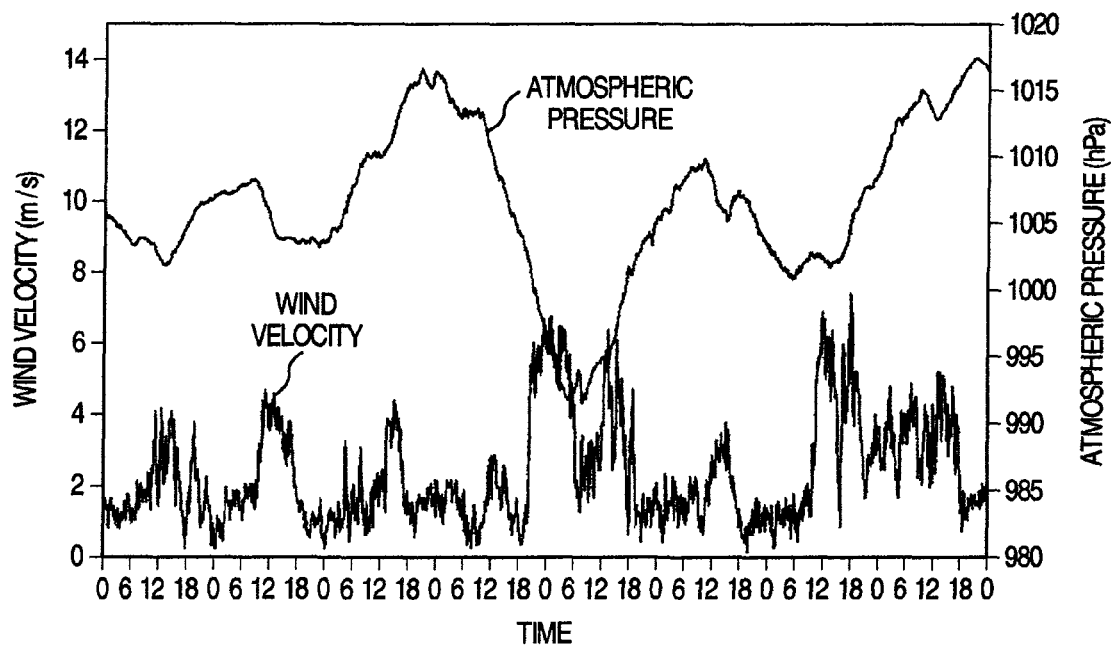
FIG. 13 graphically shows the values of atmospheric pressure and wind velocity, measured continuously as time lapses.

FIG. 13 graphically shows the values of atmospheric pressure and wind velocity, measured continuously as time lapses. As seen from FIG. 13, the change with time in atmospheric pressure has a rough correlation with the change with time in wind velocity. That is, when the atmospheric pressure is decreasing or increasing, the wind velocity is increasing. While the atmospheric pressure remains constant, the wind velocity remains constant, too. Further, the fluctuation of the atmospheric pressure with time is smaller than the fluctuation of the wind velocity with time so that it is easier to decide whether the atmospheric pressure tends to increase or decrease. Utilizing this feature, the output correcting unit 83 corrects the output estimating data shown in FIG. 6 to improve the precision thereof. The procedure of correction will be concretely described in the following.

FIGS. 14A through 14D illustrate how the output estimating data are corrected on the basis of the change with time in the measured value of the atmospheric pressure.

When the output estimating unit 52 finishes calculating the output estimating data, the output correcting unit 83 starts such a correcting process as follows.

Figure 14A:
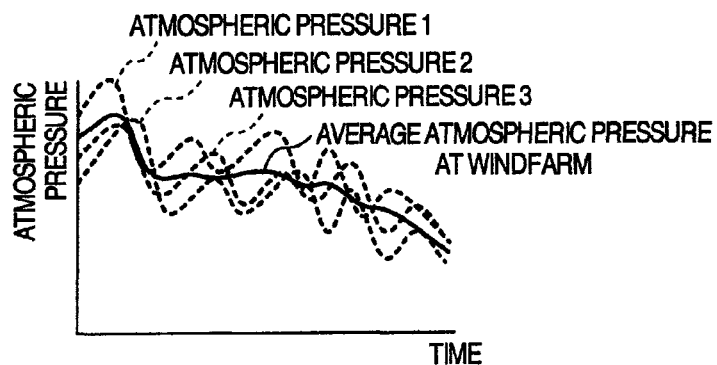
FIGS. 14A, 14B, 14C and 14D show the procedure of correcting the estimated data of output on the basis of the change with time of the values measured by the aerographs as time lapses.

To begin with, as shown in FIG. 14A, the output correcting unit 83 obtains the average barometric change at the windfarm by averaging the barometric data contained in the weather data measured by the respective aerographs 21, 22, 23 of the windfarm 100. In this way, the short-time fluctuations of the barometric changes measured by the respective aerographs are smoothed so that it becomes easier to decide whether the atmospheric pressure tends to increase or decrease.

Figure 14B:
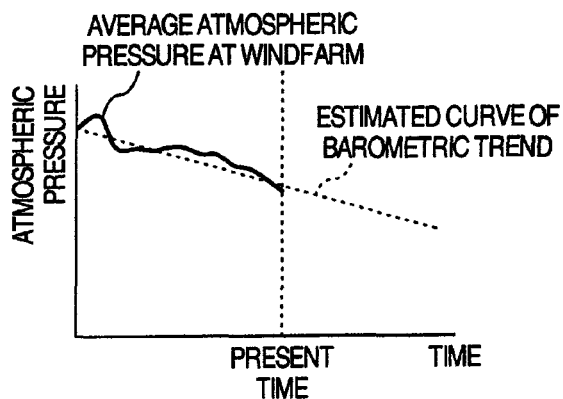

Secondly, as shown in FIG. 14B, the output correcting unit 83 estimates the barometric change in the near future to be used for the constant-output control of windfarm on the basis of the average barometric change obtained at the site of the windfarm 100. To be concrete, the output correcting unit 83 linearly approximates the measured value of the average barometric change at the windfarm 100 and obtains the estimated curve of barometric trend by extending the linear characteristic into the future.

Figure 14C:
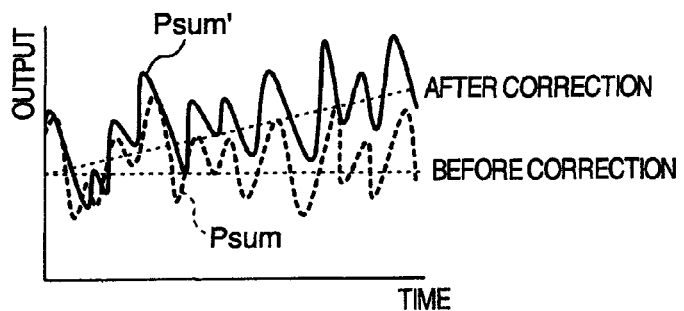

Thirdly, as shown in FIG. 14C, the output correcting unit 83 corrects the estimated value $P_{sum}$ that is the average output of the windfarm as a whole, by using the estimated curve of barometric trend. To be concrete, the output correcting unit 83 constructs the straight line that is the linear approximation of the estimated value $P_{sum}$ and corrects the gradient of the straight line by multiplying the gradient of the straight line with the corrective quantity corresponding to the gradient of the estimated curve of barometric trend. And by relocating the estimated value $P_{sum}$ on the corrected straight line, the post-correction estimated value $P_{sum'}$ can be calculated. It is to be noted here that the corrective quantity corresponding to the gradient of the estimated curve of barometric trend is previously obtained through statistic processing from the measured values of the atmospheric pressure and the windfarm output.

Figure 14D:
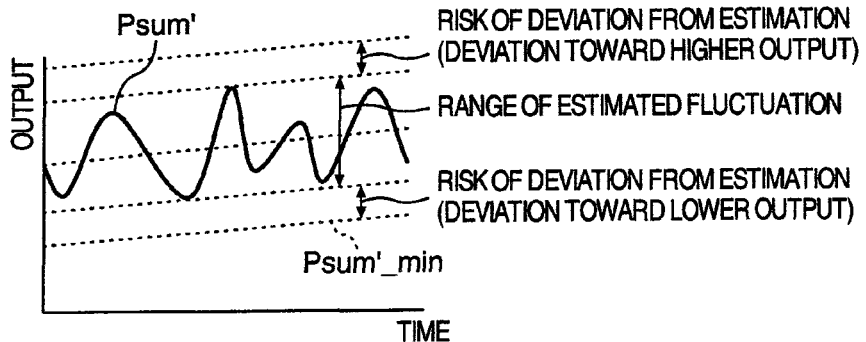

Finally, as shown in FIG. 14D, the output correcting unit 83 determines the range of fluctuations of the estimated output derived from the post-correction estimated value $P_{sum'}$ in consideration of the risk of deviation from estimation.

To be concrete, the output correcting unit 83 continually records in advance the deviation of the actually measured value from the past post-correction estimated value $P_{sum'}$, and calculates the probability that the actually measured value deviates from the post-correction estimated value $P_{sum'}$ by a predetermined value toward the higher output side, and the probability that the actually measured value deviates from the post-correction estimated value $P_{sum'}$ by the predetermined value toward the lower output side. Then, the values of the probabilities are stored in the memory unit 42. The output correction unit 83 calculates the maximum deviation $P_{sum'\_max}$ from estimation and the minimum deviation $P_{sum'\_min}$ from estimation in the case, for example, where the probability that the post-correction estimated value $P_{sum'}$ does not deviate toward the higher and lower output sides becomes equal to 90%. It is to be noted here that these levels can be freely changed if the user sets up the values of the last mentioned probabilities from the input device (not shown).

The output correcting unit 83 delivers a level determining demand to the level determining unit 84.

Figure 15:
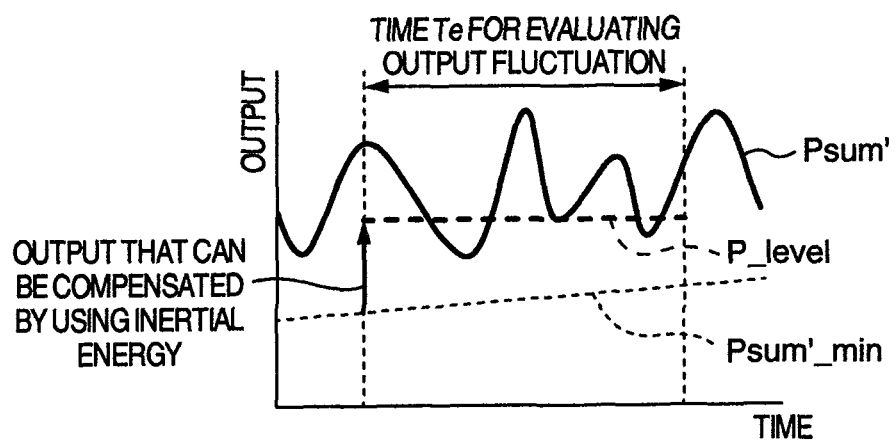
FIG. 15 show the procedure of setting up the control level on the basis of the post-correction estimated value.

Upon having received the level determining demand, the level determining unit 84 sets up as the control level $P_{\_level}$ the value equal to the sum of the minimum deviation $P_{sum'\_min}$ of the post-correction estimated value $P_{sum'}$ and the outputs of the respective wond power generators that can be accumulated as rotational energy, as shown in FIG. 15.

The outputs that can be accumulated as rotational energy may be previously stored in the output characteristic data memory area 62.

As described above, with the windfarm control system 2 according to the second mode of practice of this invention, the control level that is preferably suitable for the minimum output to be maintained can be set up by correcting the estimated value $P_{sum}$ on the basis of the barometric data.

The application of this invention is by no means limited to the above described modes of practice alone. Those modes of practice can afford various modifications within the scope of technical idea of this invention.

Figure 16:
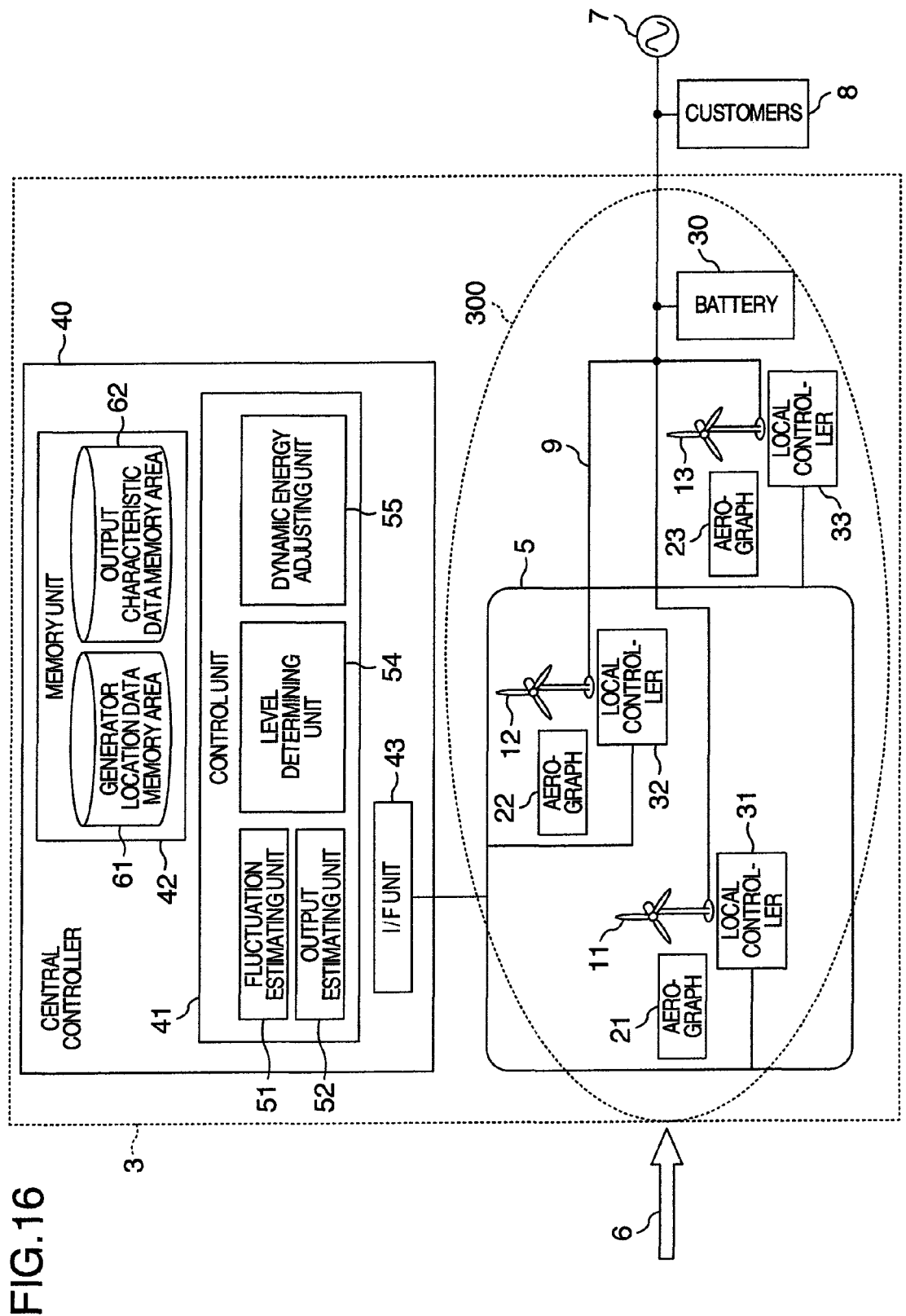
FIG. 16 schematically shows the structure of a windfarm control system 3 according to a third mode of practice of this invention.

For example, this invention can be applied to a windfarm 300 furnished with an auxiliary battery 30 as shown in FIG. 16.

In the case where the total output of the windfarm is still deviated from $P_{\_level}$ even after the respective local controllers have finished their rotation control processes, the dynamic energy adjusting unit 55 instructs the local controllers to charge electric energy into or discharge electric energy from, the battery 30. The battery 30 along with another battery (not shown) controls the supply and withdrawal of electric power into or out of the power system 7.

With this windfarm control system 3, the fluctuation of the output of the windfarm 300 can be more precisely controlled with the help of the battery 30 that charges or discharges electric energy, in addition to the estimation of the wind velocity (or output) in the near future and the smoothing of electric output through mechanical energy control.

It is to be understood here that since the windfarm control system 3 can suppress almost all types of output fluctuations by the help of the estimation of the wind velocity (or output) and the smoothing of electric output through mechanical energy control, then the battery 30 can be any type of auxiliary battery that simply meets the requirement for correcting small deviations due to errors in estimation. Accordingly, as the output fluctuation can be suppressed with a battery having capacity smaller than that of the battery used in the conventional windfarm control system, the installation cost can also be curtailed.

Figure 17:
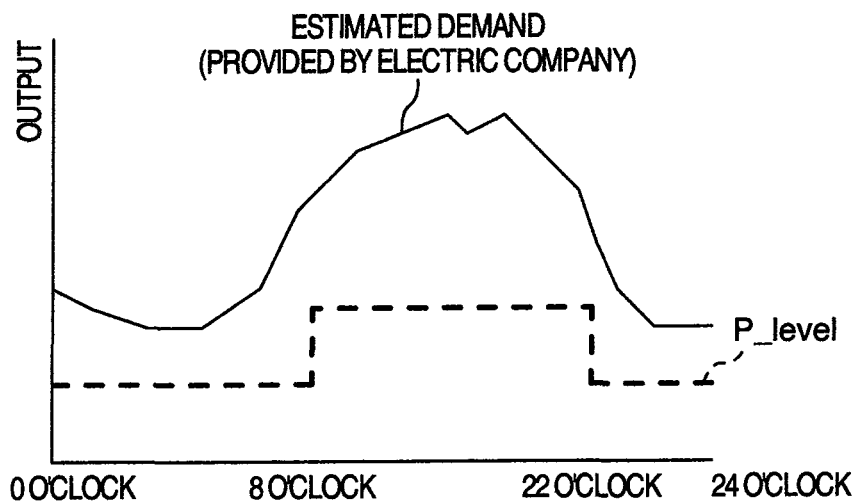
FIG. 17 graphically shows how the value of $P_{\_level}$ is modified according to the estimated demand of electric power.

Further, in an alternative mode of practice, for example, the control level $P_{level}$ may be modified according to the time period within a day or the season. FIG. 17 graphically shows how the value of $P_{level}$ is modified according to the estimated demand of electric power.

As shown in FIG. 17, the estimated demand of electric power is obtained in advance from, for example, an electric company so that level determining unit 54 can modify the value of $P_{\_level}$ to adjust the supply of electric power. For example, during night when the power demand from customers 8 is low, the output of the windfarm may be superfluous so that there may be a risk of adversely affecting the stability of operation of the power system 7. Accordingly, if $P_{\_level}$ is lowered as compared with the value of $P_{\_level}$ set up during day time by the use of, for example, a timer, the amount of electric power supply from the windfarm can be reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A windfarm control system including:
a windfarm comprising:
plural wind power generators whose rotational speeds are variable;
plural aerographs disposed in the vicinity of the wind power generators, to measure directions and powers of wind at sites of the wind power generators; and
plural local controllers disposed in the vicinity of the wind power generators, to control outputs of the wind power generators by controlling the rotational speeds of the wind power generators; and
a windfarm controller for executing the processes of:
locating the most windward one of the wind power generators on the basis of the directions and powers of the wind detected by the aerographs;
estimating fluctuations of wind velocities at the sites of the wind power generators during a predetermined time period on the basis of the direction and power of the wind at the site of the most windward wind power generator and distances and directions of the other wind power generators measured from the most windward wind power generator;
estimating a fluctuation of an output of the windfarm as a whole during the predetermined time period on the basis of the fluctuations of the wind velocities at the sites of the wind power generators;
calculating a control level that is a value of the output of the windfarm as a whole whose maintained value is guaranteed during the predetermined time period;
obtaining values of the outputs of the wind power generators;
calculating outputs of the wind power generators which make the output of the windfarm as a whole equal to the control level, and rotational speeds of the wind power generators which produce the calculated outputs of the wind power generators; and
delivering the calculated outputs and rotational speeds of the wind power generators to the local controllers associated respectively with the wind power generators.

2. A windfarm control system as claimed in claim 1, wherein the windfarm controller sets up the minimum value of the output fluctuation as the control level.

3. A windfarm control system as claimed in claim 1, wherein the windfarm controller executes the processes of:
setting up the average value of the output fluctuation of the windfarm as a whole as the control level;
calculating the outputs of the wind power generators which make the output of the windfarm as a whole equal to the control level when the output of the windfarm as a whole is greater than the control level, and the rotational speeds are greater than the maximum rotational speed that produces the output, so that the calculated outputs and rotational speeds can be delivered to the local controllers; and
delivering the calculated outputs of the wind power generators which make the output of the windfarm as a whole equal to the control level when the output of the windfarm as a whole is less than the control level, and instructions for reducing the rotational speed to the extent that the output is obtained, to the local controllers associated with the wind power generators.

4. A windfarm control system as claimed in claim 1, wherein the windfarm controller calculates the outputs of the wind power generators in such a manner that the outputs of the wind power generators become equal to one another.

5. A windfarm control system as claimed in claim 1, wherein
the aerographs also measure an atmospheric pressure; and
the windfarm controller also executes the process of correcting the output fluctuation depending on a change in the atmospheric pressure during the predetermined time period.

6. A windfarm control system as claimed in claim 1, wherein the windfarm controller changes the control level depending on a time period of a day.

7. A windfarm control system as claimed in claim 1, wherein the windfarm controller
calculates the value of the output of the windfarm as a whole by obtaining the values of the outputs of the wind power generators after the local controllers have finished controlling the rotational speeds of the wind power generators; and
instructs a battery to charge or discharge electric energy so that the value of the output of the windfarm as a whole becomes equal to the control level.

8. A windfarm controller for controlling a windfarm including plural wind power generators whose rotational speeds are variable, the windfarm controller executing the processes of:
locating the most windward one of the wind power generators on the basis of directions and powers of wind detected by aerographs;
estimating fluctuations of wind velocities at sites of the wind power generators during a predetermined time period on the basis of the direction and power of the wind at the site of the most windward wind power generator and distances and directions of the other wind power generators measured from the most windward wind power generator;
estimating a fluctuation of an output of the windfarm as a whole during the predetermined time period on the basis of the fluctuations of the wind velocities at the sites of the wind power generators;
calculating a control level that is a value of the output of the windfarm as a whole whose maintained value is guaranteed during the predetermined time period;
obtaining values of outputs of the wind power generators;
calculating outputs of the wind power generators which make the output of the windfarm as a whole equal to the control level, and rotational speeds of the wind power generators which produce the calculated outputs of the wind power generators.

9. A control method for a windfarm including plural wind power generators whose rotational speeds are variable, the control method comprising the steps of:
measuring directions and powers of wind at sites of the wind power generators;
locating the most windward one of the wind power generators on the basis of the directions and powers of the wind detected by the aerographs;
estimating fluctuations of wind velocities at the sites of the wind power generators during a predetermined time period on the basis of the direction and power of the wind at the site of the most windward wind power generator and distances and directions of the other wind power generators measured from the most windward wind power generator;
estimating a fluctuation of an output of the windfarm as a whole during the predetermined time period on the basis of the fluctuations of the wind velocities at the sites of the wind power generators;

calculating a control level that is a value of the output of the windfarm as a whole whose maintained value is guaranteed during the predetermined time period;

obtaining values of outputs of the wind power generators;

calculating outputs of the wind power generators which make the output of the windfarm as a whole equal to the control level, and rotational speeds of the wind power generators which produce the calculated outputs of the wind power generators, so that the rotational speeds of the wind power generators can be controlled.

* * * * *